Geo Phillips.
Imp't in Rock Drilling Engines.
No. 117678. Patented Aug 1 1871.
A.
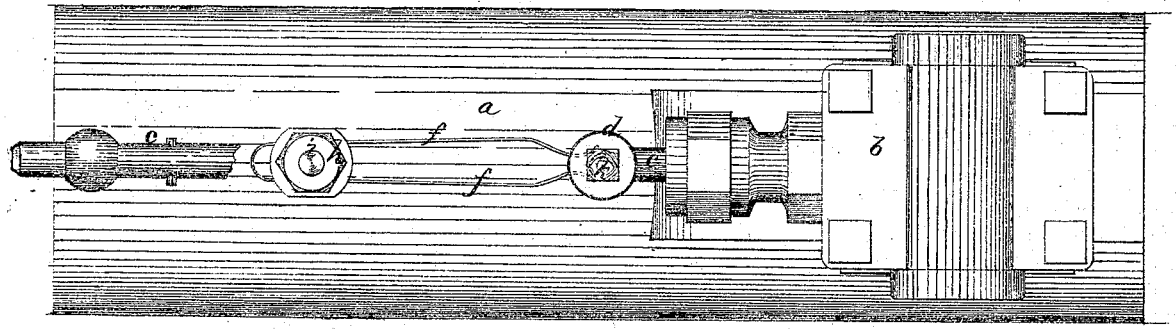
B.
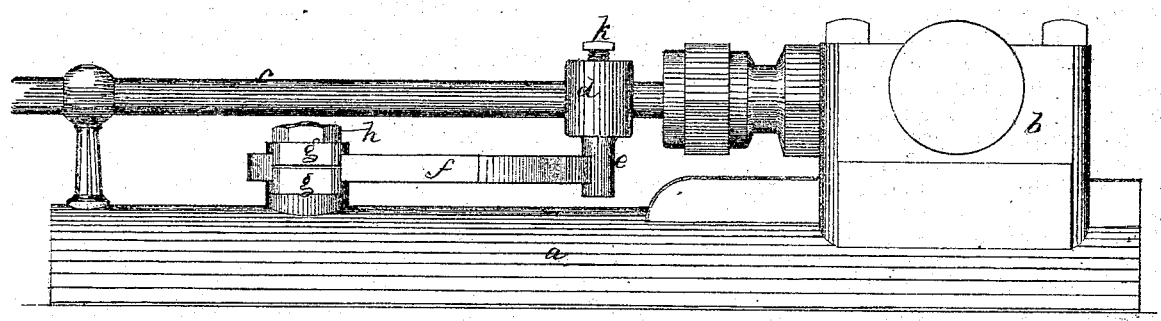
C.
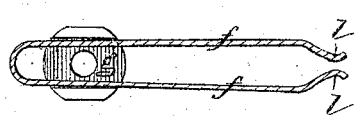
Witnesses.
M. W. Frothingham.
L. H. Latimer.
George Phillips.
By his Attys.
Crosby & Gould 117,678

UNITED STATES PATENT OFFICE.

GEORGE PHILLIPS, OF ALLEGHANY, CALIFORNIA, ASSIGNOR TO THE BURLEIGH ROCK-DRILL COMPANY, OF FITCHBURG, MASSACHUSETTS.

IMPROVEMENT IN ROCK-DRILLING ENGINES.

Specification forming part of Letters Patent No. 117,678, dated August 1, 1871.

*To all whom it may concern:*

Be it known that I, GEORGE PHILLIPS, of Alleghany, in the county of Sierra and State of California, have invented an Improvement in Rock-Drilling Engines; and I do hereby declare that the following, taken in connection with the drawing which accompanies and forms part of this specification, is a description of my invention, sufficient to enable those skilled in the art to practice it.

In the construction of the drilling-machines known as "Burleigh rock-drills" (in which the drill is in direct line with the piston-rod or is an elongation of the piston-rod of the motive cylinder) much difficulty has been experienced in keeping the valve-rod in position on account of the blow and rebound of the drill and the jar of the cylinder and valve-mechanism consequent thereupon. To obviate this the valve-chest has been provided with a stuffing-box and a packing forced tightly upon the valve-rod. This is objectionable in that it interferes with the free movement of the valve-rod at any and all times, the concussion and rebound soon destroy the packing, and foreign and gritty matters are drawn into the valve-chest between the packing and the rod.

The object of my invention is to remedy this defect, and I accomplish this by fastening upon the rod a head or slide, from which projects a pin that, in the movement of the valve-rod, passes between the two ends of a spring-fork, which ends are bent so that they press upon the pin and prevent its movement except by the action of the valve-shifting tappets. This spring-fork is so made as to permit the necessary and free shifting movement of the valve, but to prevent all other movements; and it is in the combination, with the valve-rod, of a suitable spring or spring-fork acting upon a projection from the rod and permitting movement of the rod to shift the valve, but preventing rebounding or irregular movement of the valve, that my invention consists.

The drawing represents a valve-rod and valve-chest embodying my improvement. A shows the mechanism in plan. B is a side elevation of it. C is a sectional view of the spring, and the nut for securing the spring in position.

$a$ denotes the cylinder; $b$, the valve-chest; $c$, the valve-rod. The rod slides in suitable guides, and is actuated by suitable tappets to reciprocate the valve. Upon the rod is fixed the head $d$, fastened in suitable position upon the rod by a screw, from which head extends a pin, $e$, as seen at B. $ff$ denote the two arms of the spring-fork or tongs, the rear end of the fork passing through two holders or clamps, $g$, which are forced tightly against the fork by a nut, $h$, and screw $i$, the fork being capable of sliding movement through the clamp when the nut is loosened, and being fastened in any suitable position. The head of the pin $e$ slides on the rod $c$, and is secured in position by a screw, $k$. The ends of the arms $ff$ are bent, as seen at C, and their outwardly-turned ends form inclines bearing against the pin and holding it in position.

When the valve is moved in one direction the ends of the spring yield or open and allow the pin to pass between and by the points $l\ l$, when they again close or spring inward and hold in position the pin and valve-rod and valve. When the valve is again moved in the opposite direction the pin passes through the points $l\ l$, opening the springs until it gets by the points $l\ l$, when the stress of the springs will urge the pin along. It will be seen that the valve-rod is never released from the contact of the springs, but that they tend at all times to hold it in proper position or to insure it from all movement other than that attending the proper reciprocation of the valve.

Instead of the spring-fork or double-spring, a single spring may be used, so formed as to latch or lock the rod in position, except when moved at proper times by the action of the piston of the main cylinder; but I prefer the spring-fork.

I claim—

The spring or spring-fork for arresting or preventing irregular movement of the valve, substantially as described.

Executed April 23, A. D. 1871.

GEORGE PHILLIPS.

Witnesses:
C. W. RICE,
JOHN KOUTZ.